T. P. PAYNE.
AGRICULTURAL MACHINE.
APPLICATION FILED AUG. 9, 1919.

1,355,774.

Patented Oct. 12, 1920.
9 SHEETS—SHEET 1.

Inventor
THEODORE P. PAYNE

By
Attorney

T. P. PAYNE.
AGRICULTURAL MACHINE.
APPLICATION FILED AUG. 9, 1919.

1,355,774.

Patented Oct. 12, 1920.

WITNESS

INVENTOR
THEODORE P. PAYNE

UNITED STATES PATENT OFFICE.

THEODORE PESINGER PAYNE, OF NEW YORK, N. Y.

AGRICULTURAL MACHINE.

1,355,774.   Specification of Letters Patent.   Patented Oct. 12, 1920.

Application filed August 9, 1919. Serial No. 316,317.

*To all whom it may concern:*

Be it known that I, THEODORE P. PAYNE, a citizen of the United States, residing at New York, in the county of New York and State of New York, have invented certain new and useful Improvements in Agricultural Machines, of which the following is a specification.

The present invention relates to certain improvements in my former Patent No. 1195851 dated August 22, 1916, intended to stabilize the machine in its operation regardless of the irregularities and grades of the ground which it traverses.

Two principal objects are achieved by the present invention. One of these objects is to equip the machine with auxiliary appliances which provide reliable automatic compensation for unequal wheel base travel so as to effectually maintain the superstructure at approximately right angles with the track by providing the necessary compensation for the variable hypotenuse length incident to unequal wheel base travel, and at the same time providing means for automatically accelerating the speed of the lagging wheel base until the wheel base travel becomes equal. The other important and principal object of the invention is to provide for automatic bridge platform compensation in cases where unequal grades will tend to proportionately warp the overhead bridge structure. When such a condition arises, as in very hilly country, the present invention provides for automatically correcting the twisting or warping of the structure by truing the bridge platform to the position thereof at the fixed end of the structure.

A more general object is to provide a novel wheel base mounting, in combination with the bridge structure, which adapts the machine for the automatic compensation features, thus insuring its reliable operation to meet varying grades of terrain and irregularities therein.

With these and other objects in view which will be readily apparent as the nature of the invention is better understood the same consists in the novel construction, combination and arrangement of parts hereinafter more fully described, illustrated and claimed.

The invention is necessarily susceptible of various structural changes and modifications without departing from the spirit or scope of the invention but a preferable and practical embodiment thereof is shown in the accompanying drawings, in which:—

Similar reference characters designate corresponding parts throughout the several figures of the drawings.

As heretofore stated the present invention is directed to improvements in a structure of the type set forth in my former Patent No. 1,195,851, and therefore the primary structural features involved are necessarily the same. That is to say, the present improvements are embodied in a traveling structure of the gauntree type adapted to be propelled over suitable tracks or the like for the purpose of carrying implements of tillage over relatively large tracts of ground, and therefore, the present improvements are embodied in a structure designated generally as C in Fig. 1 of the drawings, and consists primarily of the upper bridge platform A and the opposite vertically disposed uprights or bents B which constitute the vertical portions of the gauntree structure. The said bents B or vertical end portions of the gauntree are mounted in a novel manner upon the wheeled trucks T for the purpose of compensating for the variable hypotenuse lag or deflection of the bridge platform A, in accordance with one of the primary objects of the invention, while at the same time there is a novel automatic warp compensating unit W provided between one of the bents B and one end of the bridge platform A in accordance with the other primary and important improvement, as heretofore indicated. In the present embodiment of the invention it is also proposed to utilize an implement attaching platform C which may be suspended from the bridge platform A by the cables c or the like and spans the space between the opposite vertical portions of the gauntree or bents B.

Referring first to the feature of improvement which constitutes the improved self-adjusting or compensation mounting for the bents B on the trucks T, reference may be had to Figs. 2, 3, 4 and 5 of the drawings which particularly show the arrangement and construction involved. However, before proceeding to a detailed description of the said construction the general purpose and effect of the same will be briefly set forth with a view to facilitating the complete understanding of this important phase of this invention.

By reason of the relatively large character of the gauntree structure, it is obvious that if the bridge or span is of considerable length, many factors must be reckoned with in keeping the same at right angles to the track, and if the entire structure were rigid, that is, the bridge platform and bents were rigidly mounted on the trucks, the same would be subjected to abnormal twisting strains which would be likely to rupture, break or otherwise damage the apparatus. For instance, if one set of trucks would be compelled to traverse a section of track which was more or less rolling while the other track was horizontal more resistance would be offered to the trucks on the former track and thus impede the progress of that end of the bridge platform, or, on the other hand if the motors for driving one set of trucks operated relatively slower or faster than the motors of the opposite trucks, the same conditions would occur. The effect of trucks at one side of the bridge encountering more resistance or lagging more than the other is to cause the bridge to assume an oblique position with reference to the tracks, and form with relation to the normal position of the span, an imaginary triangle, of which the abnormal position of the bridge would represent the hypotenuse.

It is this so-called hypotenuse position of the bridge platform that the present invention aims to correct. And, in order to provide for contingencies that have a tendency to cause the conditions set forth the present improvement contemplates a novel compensation mounting for the entire gauntree structure which will permit of the trucks following the track-way without imparting any damaging effect to the bents or bridge platform, while at the same time automatically correcting the position of the superstructure.

By reference to the drawings it will be observed that the lower ends of the bents A are mounted on a sill frame F which consists of the opposite sill members 1 and 2 rigidly held in spaced relation by means of suitable cross braces 3 to thereby provide a relatively open sill frame for accommodating therein a suitable truck bolster designated in its entirety as 4. The sill frame F is therefore a part of the bents which carry the bridge platform or span and thus always remains at right angles to the longitudinal center of the bridge. Accordingly, to provide for the necessary relative movement between the sill frame and the bolster 4 when the trucks at one side of the gauntree lag behind those at the other side, the said sill frame has a relatively lateral movement on the bolster. This mounting may be provided through the location at the central part of each sill, of suitable transverse bearing plates 5 having laterally elongated slots 6 for slidably receiving suitable bearing blocks 7 which carry therewith a king pin 8 for pivotally mounting the bolster 4 within the sill frame.

The said bolster 4 preferably consists of the opposite girders 9—9 connected by suitable cross braces 10 carrying therewith the wheeled trucks T—T which will of course always follow and remain in alinement with the tracks over which the entire apparatus moves. At the central portion of the bolster are the transverse upper and lower plates 11—11 which are provided with an opening for receiving the king pin 8. By reason of its mounting in the plates 11—11 the pin has a relatively fixed pivotal engagement with the bolster, and in turn through the medium of the plates 7—7 has a relatively sliding and pivotal connection with the sills, whereby the bolster may follow the track even though the sill which is rigid with the superstructure is forced out of alinement therewith.

Figures 1, 4, 5:
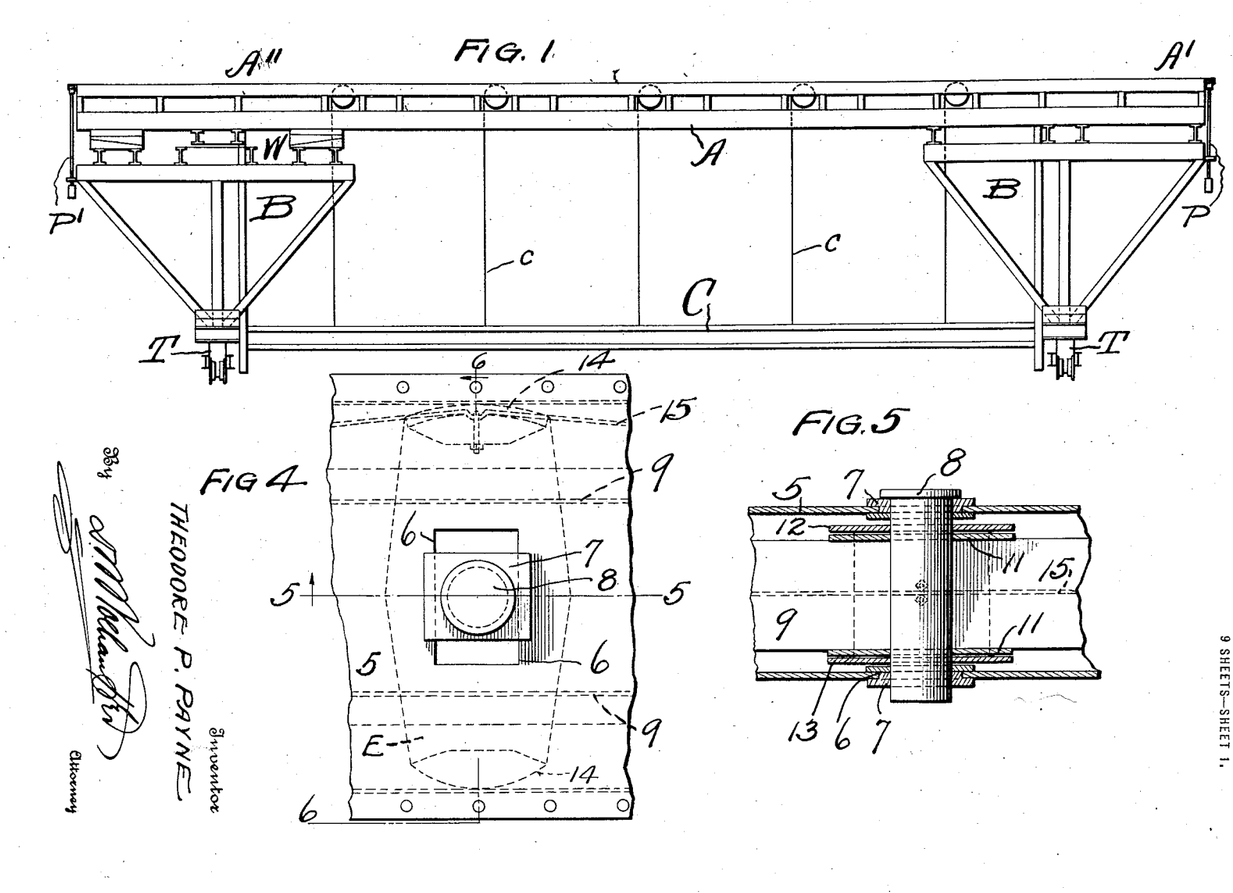
Figure 1 is a diagrammatic view showing the general arrangement of the traveling structure of the gauntree type, embodying the present improvements.
Fig. 4 is an enlarged detail plan view showing the pivotal connection between the bolsters of the truck frame and the sill frames of the bents.
Fig. 5 is a vertical cross sectional view taken on the line 5—5 of Fig. 4.
Figure 2:
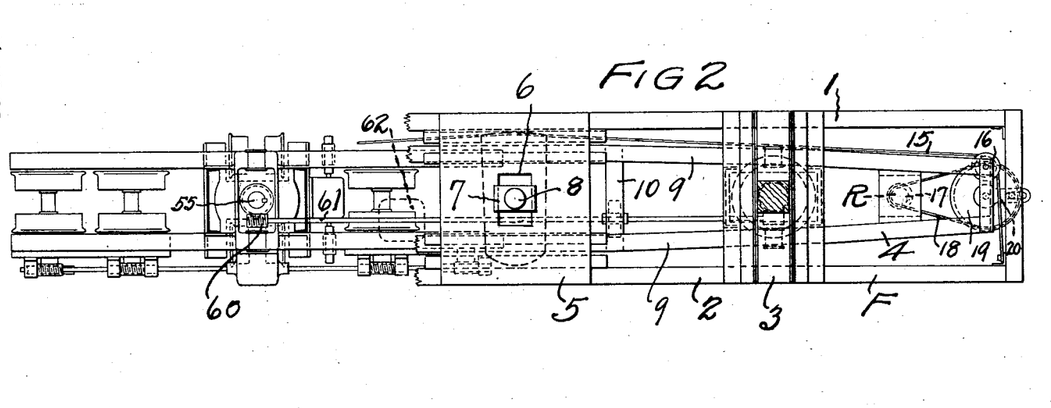
Fig. 2 is a top plan view of the self-adjusting or compensation mounting for the vertical portions or bents of the gauntree structure.
Figure 3:
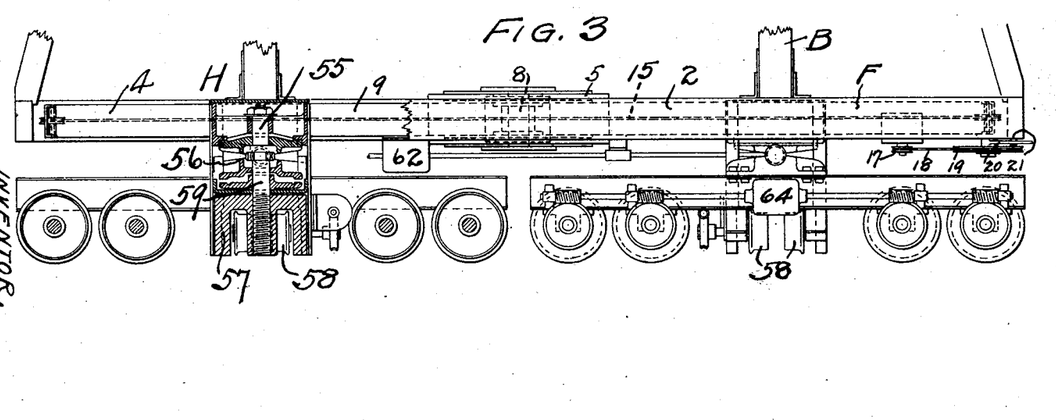
Fig. 3 is a side elevation of the construction shown in Fig. 2.
Figure 6:
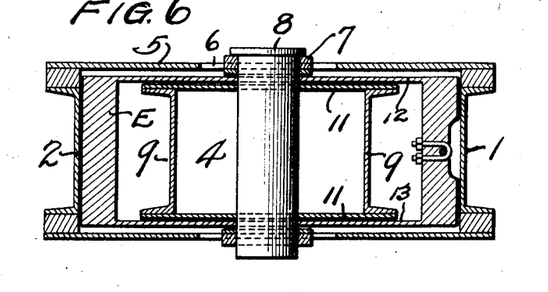
Fig. 6 is also a vertical cross sectional view taken on the line 6—6 of Fig. 4.
Figure 7:
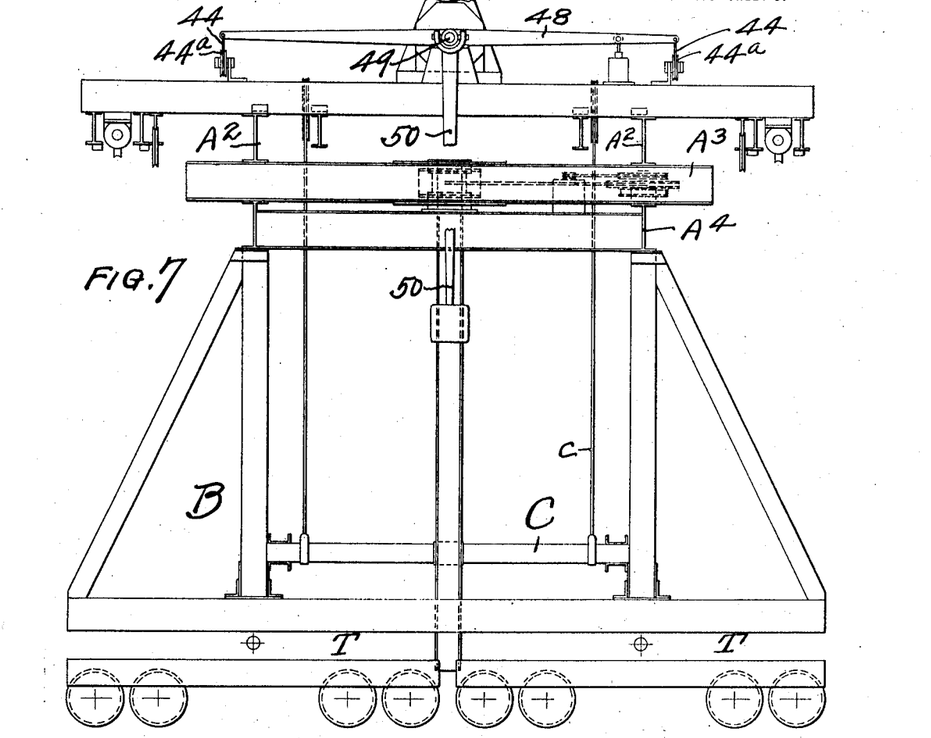
Fig. 7 is a side elevation of the bent which has a rigid connection with the bridge platform.

Thus, by the arrangement described the entire gauntree structure may satisfactorily respond to any differential movement at the opposite ends thereof without being subjected to undue strains, but in addition to this the present improvement contemplates means for automatically and positively correcting this relative differential movement with a view to always maintaining the proper transverse relation of the bridge to the trackway. That is to say, the king pin 8 which occupies a fixed position on the bolster has pivotally mounted thereon a suitable cam element E, which consists of the upper and lower plate elements 12 and 13 pivotally receiving the king pin 8, and connected by the vertical cam webs 14. The said cam element E is therefore concentric with the fixed king pin 8, and has a camming bearing engagement with the opposite members 1 and 2 of the sill frame, whereby the movement of the cam will have a tendency to center the frame with reference to the pivot.

Normally the cam E occupies a position transversely of the sill frame with its ends in bearing engagement with the opposite beams 1 and 2 thereof, and it is maintained in this relative position by means of a flexible cable 15 leading from the central portion of the web 14 around a pulley 16 at the forward end of the bolster and connected to the sill adjacent the beam thereof which is opposite the beam engaged by the end of the cam to which the other end of the cable is attached. This flexible connection between the cam plate and the end of the sill frame is duplicated in opposite directions at both sides of the cam, so that the movement of the sill frame in either direction will operate the cam plate to cause the adjustment of the sill frame with reference to the bolster. The correct functioning of the cam E is assured by reason of the fact that the length of the arc traversed by the end of the sills to which the cables are attached multiplies the angular arc traversed by the cam so that as the sill has a tendency to move to an oblique position the cable will operate the cam in such a manner as to push the sill frame in the opposite direction from that which it is tending to go by reason of unequal forces of propulsion or resistance to progress.

Another novel feature in connection with the relative adjustable mounting of the bolster and the sill frame is that of mounting a motor controller R for the electric driven motors of the trucks on the bolster, the controller shaft of said motor being provided with a pulley 17 which has noosed thereabout a cable 18 which engages another pulley 19 having rigid on its shaft an arm 20 provided with a slot engaging pin 21 on the sill frame. If a set of trucks is lagging and the bolster and sill frame are out of proper alinement, this arrangement will operate pulley 17 to shift the controller to such a position that the motors will be permitted to speed up and thus propel the truck faster to make up for the lag which has caused deflection, until the separate trucks are again transversely opposite.

A further feature of improvement which is of considerable practical importance is that of automatically compensating for the relative lateral or cross-wise twisting of the overhead bridge platform due to the traveling of the entire superstructure over unequal grades, as in hilly country. To provide for this compensation it is proposed to mount one end of the bridge platform A rigidly on one of the vertical supports or bents B, while the opposite end has a relatively adjustable mounting upon the other bent. That is, it is proposed to place between one end of the bridge structure and one of the bents, means for automatically tilting either the forward or rear edge of the bridge structure to keep the same relatively level or horizontal regardless of the angle which the supports or bents are forced to assume by reason of their travel over unequal grades. Generally this means is designated as W and includes a plurality of automatically adjustable sliding wedge units M and N together with controlling means therefor which automatically comes into play when the bridge platform is warped by the structure traveling over unequal grades to restore the bridge platform to its normal level.

Figure 11:
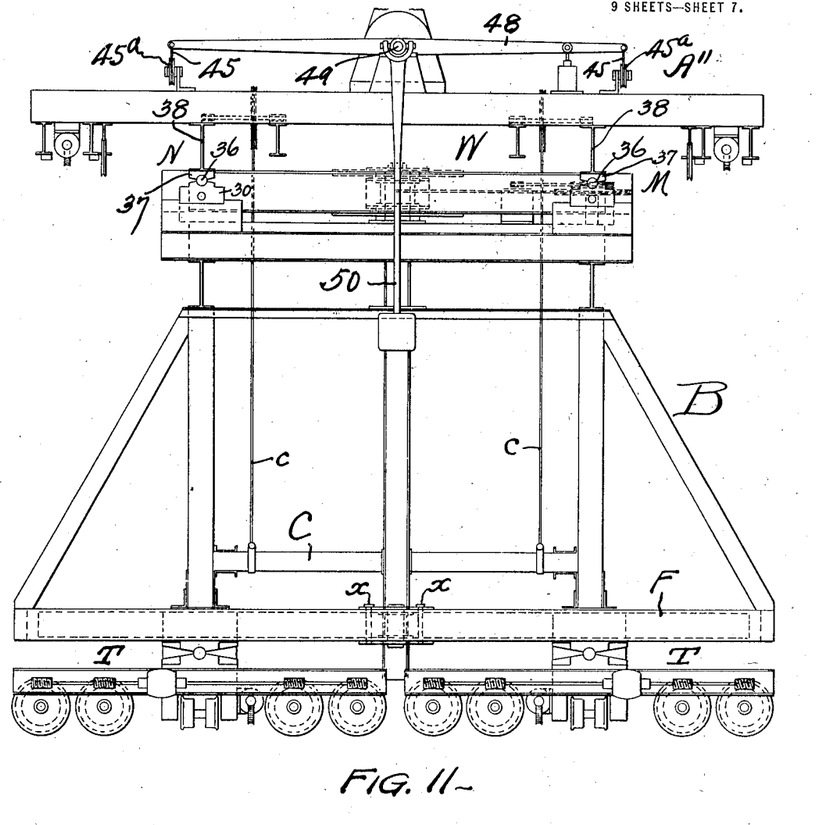
Fig. 11 is a side elevation of the bent which adjustably supports the bridge platform.
Figure 12:
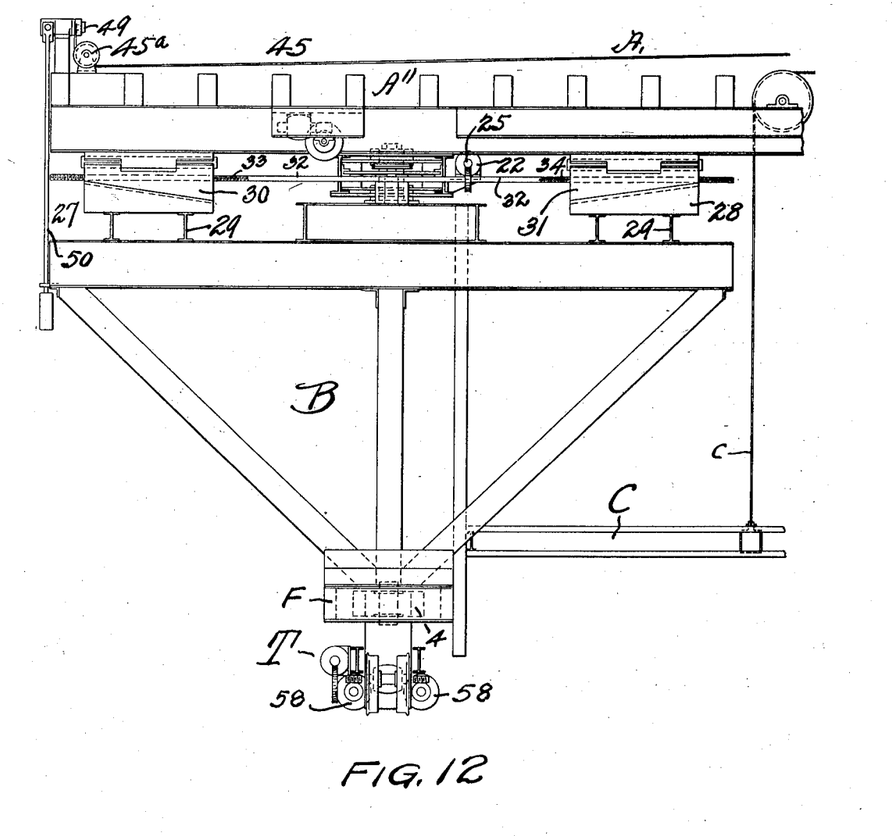
Fig. 12 is a front elevation of the bent or vertical portion of the gauntree structure shown in Fig. 9.

Accordingly, it will be understood by reference to Figs. 1, 7, 9 and 11 of the drawings, for instance, that the end A' of the bridge is the end which has a fixed connection with one of the bents B while the opposite end A'' has an adjustable connection with its bent. The fixed end A' rests directly upon the beams $A^2$, $A^3$ and $A^4$ (Fig. 7), while the adjustable end A'' has the units M and N interposed between the under side thereof and the upper part of the bent, and these wedge units constitute a compensating means for the purpose previously indicated. As shown in Figs. 11 and 12, the sliding wedge units M and N are disposed beneath the opposite edges of the bridge platform, and consist of fixed and movable wedge members, the latter being operated automatically as the gauntree structure accommodates itself to the varying grades of terrain.

As the wedge units M and N are of duplicate construction a description of one will suffice for the other. However, at this point it may be observed that both units are controlled by a common motor 22 having the opposite shaft connections 23 and 24, the former being provided with a worm 25 for operating the unit M and the latter being provided with a worm 26 for operating the unit N. The unit M is shown to best advantage in Fig. 12 and from this figure it will be observed that the same consists of the fixed wedge members 27 and 28 rigidly mounted upon suitable beams 29 carried by the bent B. These wedges 27 and 28 are oppositely disposed, that is, their wedge faces are located in inclined planes which intersect, whereby when the movable wedge members 30 and 31 which are superposed thereon are shifted from or toward each other, that is, in opposite directions, the corresponding edge of the bridge will be elevated or lowered to compensate for the angle of cant of the bent. The said movable wedges 30 and 31 are shifted upon the inclined surfaces of the wedges 27 and 28 by means of a common actuating shaft 32 which is provided at its wedge engaging ends with the reversely turned threads 33 and 34, whereby when the shaft is operated by the worm 25, the said wedges will be either forced away from each other to elevate the edge of the platform at which the unit M is located, or on the other hand will be moved toward each other to permit the edge of the platform which they support to be lowered.

The manipulation of the wedge members of the unit N are accomplished in the identical manner as those of the unit N through the medium of the motor driven shaft 24 and worm 26 thereon. The arrangement of the worms 25 and 26 and their corresponding shafts is such that the said worms will impart a reverse drive to the worm wheels on the operating shafts for the movable wedges, thus insuring the lowering of one edge of the platform while the opposite side is elevated.

For the purpose of providing for the relative movement between the shiftable wedges 30 and 31 and the bridge, the said wedge members have their outer faces formed to receive a bearing pin 36, upon which is seated the saddle block 37 for supporting the beams 38 of the bridge platform. As shown in Fig. 11 the upper surface of the shiftable wedge members 30 and 31 and the lower faces of the saddle blocks 37 are provided with sufficient lateral clearance for permitting relative movement between the bridge and bent.

The motor 22 which operates the manipulating shafts of the units M and N has suitable circuit connections not shown with a novel switch device S which is slidably mounted between transverse beams 39 of the bridge platform (Fig. 10), and is operatively connected with suitable pendulum devices P and P' located at opposite ends of the bridge platform.

Figure 10:
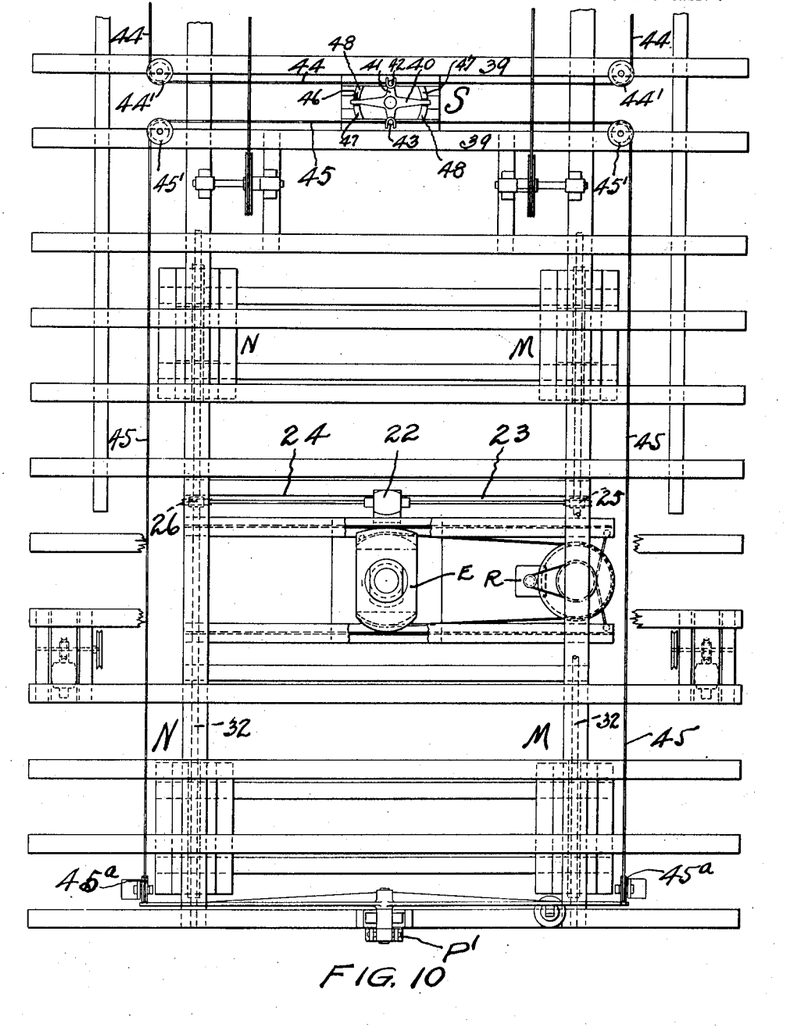
Fig. 10 is a plan view of the bridge platform which has a novel mounting on one of the bents for correcting the transverse warping.

In connection with the switch S it will be observed from Fig. 10 that the same includes in its organization a switch arm 40 having the oppositely disposed operating handle portions 41 which are connected as at 42 and 43 with endless cables 44 and 45 respectively leading to the pendulum devices P and P' at the fixed and movable ends of the bridge platform. Normally the switch arm 40 of the switch S is adapted to rest on the insulated portions 46 of the switch, but when there is a differential movement in either one of the cables 44 or 45 due to the relative movement of the pendulum devices with reference to the bridge platform, the said switch arm will be moved off of the insulated part of the switch and onto the metallic contact portions thereof to close an electrical circuit to the motor 22. It will of course be understood that when the contact arm connects diagonally opposite metallic segments 47 for instance, the motor will be driven in one direction, and when it contacts with the other metallic segments 48 the operation of the motor will be reversed.

From the foregoing it will be apparent that when there is a differential movement between the cables 44 and 45 the switch arm 40 will be turned to close a circuit to the motor 22, but in event there is the same extent of movement in the same direction of the opposite cables 44 and 45, that is, in synchronism, as when both ends of the structure is tilting to the same degree as it moves over equal grades, the entire switch S will slide transversely of the bridge platform in unison with both of the cables without movement of the switch blade 40. This movement of the switch S as a unit is made possible by the slidable mounting thereof between the beams 39 of the bridge platform, as previously indicated.

Figure 8:
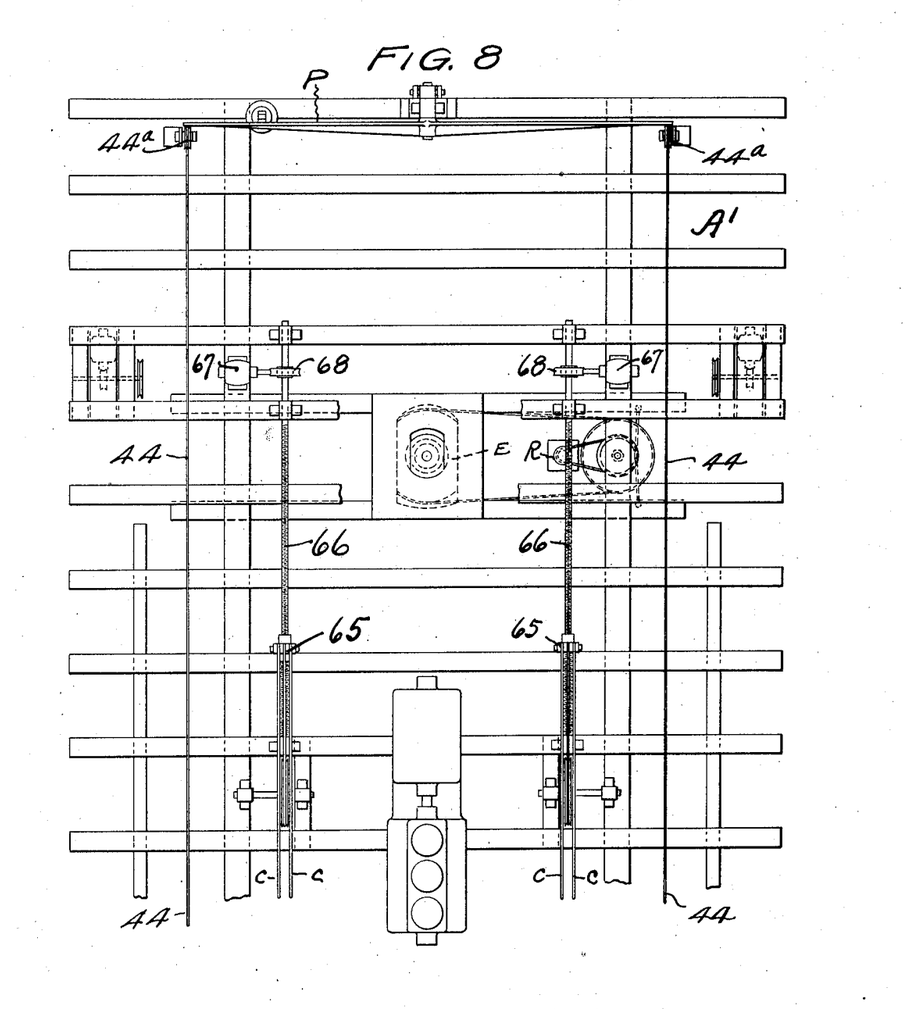
Fig. 8 is a top plan view of the fixed end portion of the bridge platform shown in Fig. 7.
Figure 9:
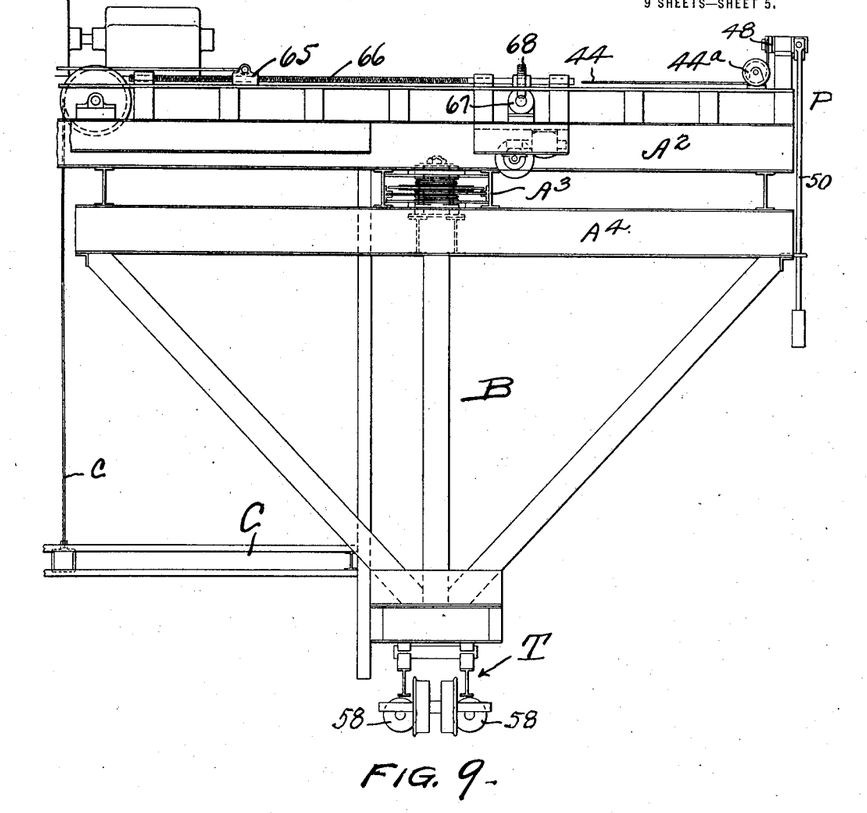
Fig. 9 is a front elevation of the structure shown in Fig. 7 (fixed end of bridge).

In connection with the cables 44 and 45 which respectively lead to the pendulum devices P and P', it may be observed from Figs. 8 and 10 that these cables pass over suitable pulleys 44' and 45' near the center of the bridge platform, and other pulleys 44$^a$ and 45$^a$ at the opposite extremities of the platform where they connect with the pendulum devices P and P'.

As the said pendulum devices P and P' are duplicates, a description of one will suffice for the other. As will be observed from Figs. 7 and 11 these devices include a horizontal cross arm 48 pivotally supported as at 49 and having its opposite ends formed to receive one of the cables leading to the switch, as previously described. The pivotal support or axis for the arm 48 has associated therewith a suitable weighted pendulum arm 50 which will always tend to seek a vertical plane regardless of the perpendicularity of the bent at the end of the platform at which it is located, to thereby have the effect of keeping the arm 48 horizontal whereby its cable connection will impart any relative differential movement between the platform and pendulum to the switch S.

With the foregoing arrangement it will be apparent that the cross-wise warping of the bridge structure is prevented by the pendulum devices, switch S and automatic wedge compensating means W.

The distinctive and important features of improvement, namely the truck bolsters and sill frame compensation, and the bridge platform compensation have been pointed out, but it will of course be understood that these features of the invention are necessarily susceptible of embodiment or rearrangement without departing from the invention. For instance with reference to the adjustable mounting of the truck bolsters within the fixed sill frames, this unit of construction will function just as well within the superstructure of the machine as within the lower part thereof immediately over the truck wheels, that is, between the upper portion of the bents and the end portions of the bridge platform. This suggested transposition of the said unit of construction is shown for instance in Figs. 7, 8, 9 and 10, and will obtain the desired compensation for unequal traveling of the trucks. When this unit of construction is used in both locations as in Fig. 11 only one of said units of construction will be permitted to function, the other unit of construction in the meantime being held inoperative by locking pins or bolts x indicated by dotted lines in said figure. Similar reference numerals are applied in the drawings to the same parts of the compensating units whether located at the truck or bridge ends of the bents.

Of course in carrying forward the invention the machine must necessarily be equipped, as described in my former Patent No. 1195851, with means for travel and propulsion transversely on cross tracks to shift the machine from one set of main tracks to another. Various forms of construction may be utilized for that purpose, but preferably the auxiliary drive unit designated in its entirety by the reference letter H (Fig. 3) and including a king pin mounting 55 between the truck bolster and a gimbal joint 56, which in turn is connected with a vertically adjustable carrier 57 for the transverse-traverse wheels 58. The said vertically adjustable carrier 57 has operatively connected therewith an elevating screw 59 which is geared at 60 with the operating shaft 61 driven from a suitably controlled electric motor 62. By operating the motor 62 and in turn the shaft 61 the elevating screws 59 of the auxiliary drive unit for the separate trucks may be actuated to raise or lower the vertically adjustable carrier 57. When lowering the transverse-traverse wheels 58 they will be forced down on to the cross tracks, at the same time lifting the main trucks, and by driving the said wheels 58 the whole machine will be propelled over the cross tracks in the manner and for the purpose fully described in my former patent. The driving of the transverse-traverse wheels 58 may be from a suitably controlled supplemental motor 65 as plainly shown in the group of Figs. 13 to 15 inclusive. The driving of the main truck wheels is from a suitably controlled motor 64 as plainly shown in Fig. 3.

The raising and lowering of the vertical implement carrier platform C may be accomplished by any preferable means such for instance as by having the cables c connected with a platform raising and lowering mechanism consisting of said cables and operating means therefor which include the screw nuts 65 by which the cables are connected, the operating screws 66, and the controlling motor 67 having geared connections 68 with said screws as shown in the plan view of Fig. 8.

Figures 13, 14, 15:
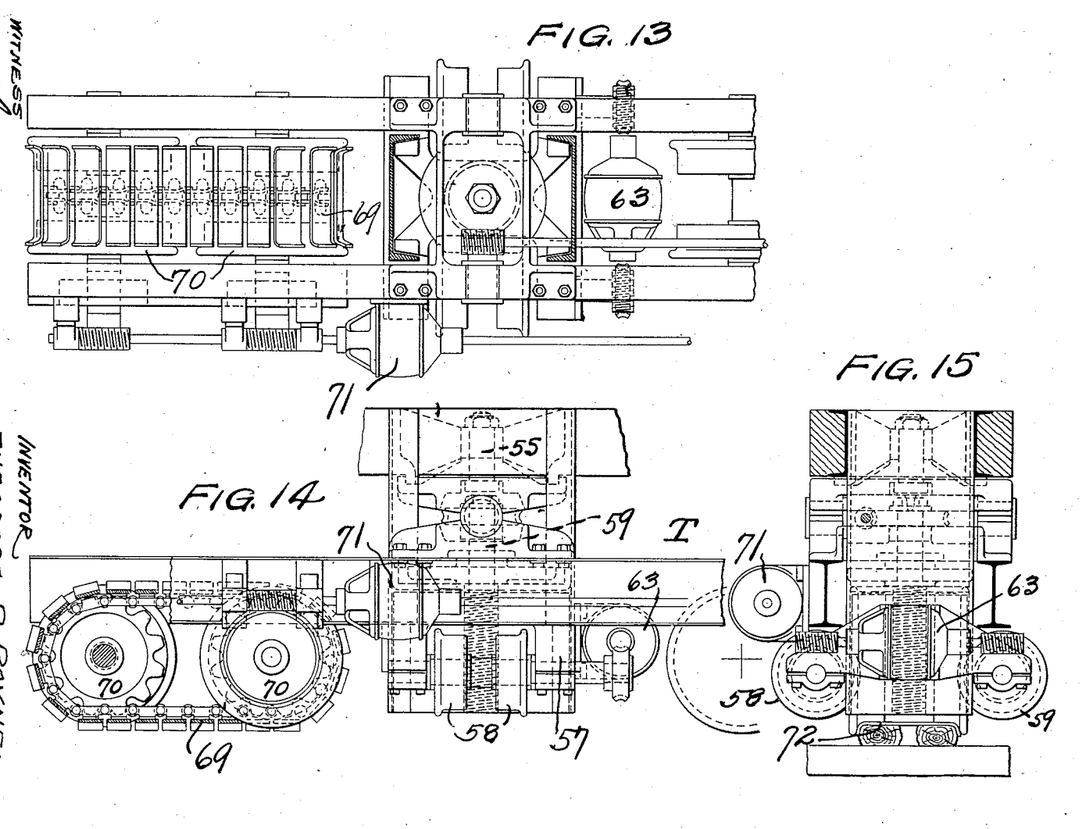
Fig. 13 is a top plan view of a modified form of traction unit.
Fig. 14 is a side elevation of the construction shown in Fig. 13.
Fig. 15 is a vertical sectional view looking at the motor end of the traction unit shown in Fig. 14.

For some work it may be preferable to increase or augment the traction power of the machine. This may be accomplished by using a chain plate propelling belt 69 mounted on oppositely arranged rollers 70 carried by the truck frame and driven from an independent driving motor 71 as shown in the group of Figs. 13, 14 and 15 of the drawings. In employing the chain belt 69 a pair of timber or track rails 72 may be used as shown in Fig. 15 of the drawings. From this figure it will be observed that the flanged edges of the chain belt engage over the outer sides of the rails 72 and thereby secure the truck against transverse displacement.

Other auxiliary features and modifications may be adopted in perfecting the machine for different work and it will therefore be understood that changes in the minor details of construction, and proportion of parts and in the use of auxiliary appliance may be resorted to without departing from the invention as defined in the appended claims.

I claim:—

1. An agricultural machine including in combination, a bridge having the opposite bents, and a wheeled truck for each bent having a self-adjusting pivotal connection therewith providing compensation for varying distances between opposite trucks due to unequal wheel base travel.

2. An agricultural machine including in combination, a bridge having the opposite bents, and a wheeled truck for each bent having a relatively transversely movable pivotal connection between the truck-bolster and the bent.

3. An agricultural machine including in combination, a bridge having the opposite bents carrying a fixed sill frame, and a wheeled truck having a bolster mounted within the sill frame and pivotally connected therewith.

4. An agricultural machine including in combination, a bridge having the opposite bents each carrying a rigid sill frame, a wheeled truck having a relatively transversely movable pivotal connection with the sill frame.

5. An agricultural machine including in combination, a bridge having the opposite bents each carrying a rigid sill frame, a wheeled truck having a relatively transversely movable pivotal connection with the sill frame and mounted for movement within the sill frame.

6. An agricultural machine including in combination, a bridge having the opposite bents each of which carries a rigid sill frame provided with supporting members having slots therein, and a wheeled truck having a relatively adjustable king bolt mounting within said slots.

7. An agricultural machine including in combination, a bridge having opposite bents each of which carries the opposite sill frames having supporting members provided with transversely disposed slots, and a wheeled truck having a bolster arranged inside of the sill frame and having a slidable king pin mounting within said slots.

8. An agricultural machine including in combination, a bridge having opposite bents each of which carries a rigid sill frame, transversely disposed plate members carried by said frame and provided with slots, a wheeled truck bolster arranged within the sill frame, a king pin carried in a stationary position by the bolster, and bearing blocks slidably fitted in the slots of the sill plates and receiving said king pin.

9. An agricultural machine including in combination, the bridge having opposite bents each of which carries a rigid sill frame, supporting plates carried by the intermediate portions of the sill frame and provided with transverse slots, a wheeled truck bolster arranged within the sill frame, transverse plates spanning the opposite members of the truck bolster, a king pin having a fixed mounting in the plates carried by the bolster, bearing blocks carried by the king pin and having a slidable engagement with the sides of the openings in the supporting plates of the sill frame.

10. An agricultural machine including in combination with a bridge having opposite bents each carrying a rigid sill frame, a wheeled truck including a bolster having a relatively transversely movable pivotal connection with the sill frame, and means actuated by the relative movement between the sill frame and the bolster for causing relative transverse shifting between the sill frame and bolster as the distance between opposite trucks may vary due to unequal wheel base travel.

11. An agricultural machine including in combination with a bridge having opposite bents, each carrying a rigid sill frame, and a wheeled truck including a bolster having a relatively transversely movable pivotal connection with the sill frame, an adjustable device carried by the bolster and operatively engaging with the sill frame for automatically causing the relative transverse shifting between the sill frame and bolster.

12. An agricultural machine including in combination with a bridge having opposite bents each carrying a rigid sill frame, a wheeled truck including a bolster having a relatively transversely movable pivotal connection within the sill frame, a cam carried by the bolster and adapted to engage with the sill frame, and an actuating connection between the cam and the sill frame.

13. An agricultural machine including in combination with a bridge having opposite bents each carrying a rigid sill frame, a wheeled truck including a bolster having a relatively transversely movable pivotal connection with the sill frame, said connection including a king pin carried by the bolster, a cam pivotally mounted on the king pin and adapted to engage opposite members of the sill frame, and a flexible operating connection between the cam and one end of the sill frame.

14. An agricultural machine including in combination with a bridge having opposite bents each carrying a rigid sill frame, the truck, a motor for the truck wheels, a bolster frame pivotally hung within the sill frame, a motor controller and means actuated by the relative movement of the sill frame and the bolster frame for operating the controller.

15. An agricultural machine including in combination with a bridge having opposite bents each carrying a rigid sill frame, the truck, a motor for the truck wheels, a bolster frame pivotally hung within the sill frame, a motor controller carried by the bolster, a motor controller operating device also carried by the bolster and having a cable connection with said motor controller, and said actuating device also operatively engaging the sill frame.

16. An agricultural machine including in combination with a bridge having opposite bents, trucks for each bent, and a compensating unit associated with each bent below the bridge and comprising a rigid frame and a pivotal frame mounted within the rigid frame, and a relatively transversely movable pivotal connection between the said pivotal and rigid frames.

17. An agricultural machine including in combination, a bridge having opposite bents and a bridge platform rigid with one of the bents, and means for movably connecting the bridge platform with the opposite bent.

18. An agricultural machine including in combination, a bridge having opposite bents, a bridge platform rigidly connected with one bent and movably connected with the other bent, and means for automatically adjusting the movably mounted end of the platform to compensate for warping of the latter.

19. An agricultural machine including a bridge having opposite bents and a bridge platform connecting the bents, and means for automatically truing the bridge platform to compensate for warping thereof.

20. An agricultural machine including in combination with a bridge having opposite bents, a bridge platform, and pendulum controlled means for automatically truing the bridge platform from a warped position.

21. An agricultural machine including in combination with the opposite bents, a bridge platform connecting the bents, platform truing means, a motor for operating said platform truing means, a controlling switch for said motor operated devices, and pendulous means for automatically operating said switch.

22. An agricultural machine including in combination with the opposite bents, a bridge platform rigidly connected with one of the bents, and an automatic adjusting device interposed between the platform and the other bent, said device including motor operated wedges arranged in paired units at opposite edges of the bridge platform, a switch device, and pendulum controlled means for actuating said switch device.

23. An agricultural machine including in combination, a bridge having opposite bents, a bridge platform rigidly connected with one of the bents, and an automatic warp correcting device interposed between the other bent and the platform, said device including a pair of wedge units located between the front and rear edge portions of the platform, a motor common to both units, a switch device electrically connected to the motor, and pendulum devices at the opposite end of the bridge platform and operatively connected with the switch.

24. An agricultural machine including in combination, a bridge having opposite bents, a bridge platform rigidly connected with one of the bents, and an automatic warp correcting device interposed between the other bent and the platform, said device including a pair of wedge units and located beneath the front and rear edge portions of the bridge platform, and each unit including fixed oppositely disposed wedges carried by the bents and shiftable wedges arranged between said fixed wedges and the platform, a shaft connecting the shiftable wedge members of each unit and adapted to shift the same toward or from each other, a reversible motor operatively connected with said shaft, a switch device electrically connected to the motor, and pendulum controlled means for operating said switch device.

25. An agricultural machine including in combination with the opposite bents, a bridge platform connecting the bents, platform truing means, a motor for operating said means, a controlling switch for said motor having a transversely slidable mounting in the bridge platform, pendulum devices located at each end of the bridge platform, and cable connections between each of the pendulum devices and the switch for operating the latter when there is a differential movement between the pendulums and also for bodily shifting the entire switch when the pendulums move in unison.

In testimony whereof I hereunto affix my signature in the presence of two witnesses.

THEODORE PESINGER PAYNE.

Witnesses:
CHARLES W. BEAR,
GEO. F. ADKINS.